April 19, 1927.
E. M. SHINKLE
1,625,571
STOP FOR ROTATING PARTS
Filed June 15, 1926 2 Sheets-Sheet 1
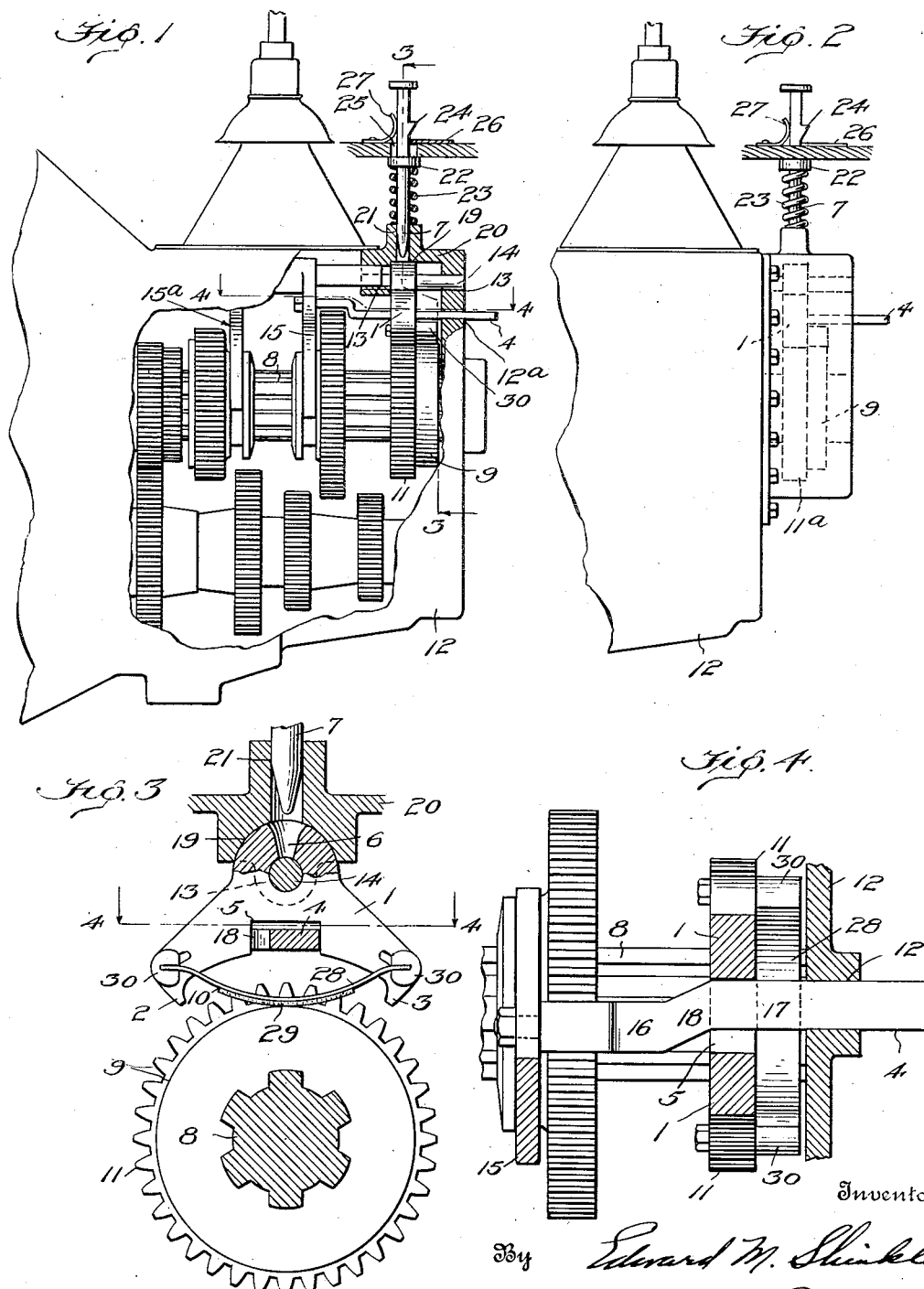
Inventor
Edward M. Shinkle
By
his Attorney April 19, 1927.

E. M. SHINKLE 1,625,571

STOP FOR ROTATING PARTS

Filed June 15, 1926  2 Sheets-Sheet 2

Inventor
Edward M. Shinkle
By
his Attorney

Patented Apr. 19, 1927.

1,625,571

UNITED STATES PATENT OFFICE.

EDWARD M. SHINKLE, OF THE UNITED STATES ARMY, HONOLULU, TERRITORY OF HAWAII.

STOP FOR ROTATING PARTS.

Application filed June 15, 1926. Serial No. 116,214.

My invention relates generally to mechanism for preventing the rotation of a driven member in one direction, and more especially to means mounted adjacent a shaft, pinion or the like, for preventing its rotation save in a given direction, that is, clockwise or counterclockwise, as the case may be.

The principal object of my invention, generally considered, is to provide means for positively locking a rotating part of a machine or mechanism against rotation in a predetermined direction.

Another object is to provide means so arranged and disposed with relation to a rotating part that said means is adapted automatically to be operated by a partial rotation in a given direction of said part to lock said part against further rotation until said means is released.

Another object of my invention is to provide manually controlled means adapted to automatically lock a propeller shaft or transmission member connected thereto against rotation in either direction at will, and to lock the same against rotation in a direction contrary to the driven direction of said shaft.

Still another object is to provide a safety device for automobiles that will operate independently of the brake mechanism to prevent accidental movements of the automobile when the latter is standing upon, ascending or descending an incline by moving forward or backward.

A further object is to provide a frictionally operable locking device for holding an automobile on an ascending or a descending grade independent of the brakes.

A still further object of my invention is to provide a mechanism adapted to stop the reverse movement of a rotating part due to inertia, gravity, or other forces.

With these and other objects in view my invention resides in the various elements and combinations of elements hereinafter set forth in the annexed specification and illustrated in the accompanying drawings, in which,—

Figure 1 is a vertical longitudinal view of an automobile transmission case, part of the side wall thereof being removed to expose the gears, and illustrating a single embodiment of my invention, the parts of the transmission being in neutral position.

Figure 2 is a fragmentary view in side elevation of a slightly modified form of that illustrated in Fig. 1.

Figure 3 is an enlarged transverse vertical sectional view taken along the line 3—3 of Fig. 1, the direction of view being indicated by the arrows adjacent the ends of said section line, showing the principal parts of a preferred embodiment of my invention.

Figure 4 is an enlarged horizontal plan view taken on the line 4—4 of Fig. 1, showing means for controlling the operation of the device seen in Fig. 3.

Figure 5:
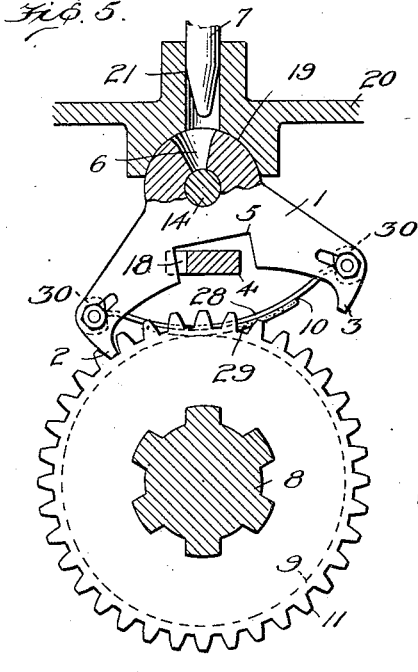
Figure 5 is a view similar to Fig. 3, showing the pawl in operative or locking position.

As will be seen from the appended claims, while I have for convenience illustrated my invention in connection with a transmission mechanism, the invention is not so limited, and the words used to describe the same should be considered in their descriptive and not in their limiting sense.

In the single embodiment of the invention here shown the stop mechanism preferably comprises a pivotally mounted pawl 1 which may conveniently be formed with a pair of ratchet engaging teeth 2 and 3. To maintain the pawl 1 from pivotal movement in one direction I preferably employ a control bar 4 which, as illustrated, is adapted to pass through a slot or recess 5 provided in the pawl. The pawl 1 is also conveniently formed with means for maintaining the same against all pivotal movement. The said means may, for example, comprise a recess 6 which is adapted to receive a bar or bolt 7, the operation of which will hereinafter be more fully described.

The shaft 8 in the transmission has attached thereto in any convenient manner a friction member which may be and preferably is in the form of a drum 9 positioned adjacent the vertical plane of the pawl 1, the said pawl being provided with means adapted to engage the drum 9 so that a movement of the said drum will cause or tend to cause a rotation of the pawl. A simple and convenient means to this end is illustrated and comprises a friction member 10 carried by or mounted on the pawl in such position as to engage the surface of the drum. It will be readily appreciated by those skilled in this art that, owing to the position of the pawl, the rotation of the drum will cause the pawl to rotate in a reverse direction.

In the particular construction here illustrated the pawl 1 is designed to cooperate with a gear 11 splined to the shaft 8 so as to rotate therewith. It will be understood that the pawl may be designed to coact with one of the transmission gears, or that a special gear 11ª, as illustrated in Fig. 2, may be provided. The only essential is that the gear which coacts with the pawl shall be rigidly connected to the shaft against rotation and maintained in alinement with the pawl teeth or tooth as the case may be.

Referring to the specific application of my invention as a safety stop for automobiles, I provide the transmission housing or case 12 with a pair of spaced bearings 13, 13 between which the pawl is pivotally mounted on a bar or axle 14. The bearings are preferably located adjacent the rear wall of the housing or case 12 so that the pawl will not interfere with the movement of the movable gears of the transmission. The pawl is so mounted that its pivotal movement will be transverse of the casing 12 and its center of motion preferably in line with the direction of movement of the shift fork which controls the operation or engagement of the low speed and reverse gears with the driven shaft of the transmission. The gear 11 is mounted on the shaft 8 which is illustrated as the driven shaft of a transmission and is so connected thereto as to be immovable longitudinally thereof. The plane of the gear 11 is the same as the plane of the pawl 1. The latter is adapted to overhang the former, and is normally spaced therefrom as shown in Fig. 3.

The control bar 4 is preferably connected in any convenient manner to the fork 15 so as to be movable therewith. The bar 4, as stated above, is adapted to slide within the slot 5 in the pawl, and the said bar is preferably formed with lateral offset rectangular stop portions 16 and 17 connected by a cam portion 18. To maintain the bar 4 against thrusts when the pawl is acting as a stop, the bar is preferably elongated and is adapted to pass through a bearing 12ª formed on a convenient portion of the transmission case.

As the pawl 1 is required to withstand great pressure, as will be hereinafter explained, I preferably provide the same with a thrust bearing 19 concentric with the pivotal axle of the pawl so that the strains on the axle will be reduced and the life of the mechanism greatly extended. The bearing 19 is formed in the cover plate or top portion 20 of the transmission case 12 and the rod or bolt 7 passes through said bearing to engage the recess 6 of the pawl 1. To guide the rod or bolt 7 I may form a bushing or guideway 21 within which the bolt 7 is slidably mounted. The bolt 7 is provided with a collar 22 between which and the guideway 21 is interposed a spiral spring 23. The bolt 7 may also be formed with a step or offset portion 24 so that when the bolt is depressed the shoulder will extend under the edge of an adjacent opening 25 in the floor board 26 and lock the bolt in depressed position against tension of the spring 23. To ensure the action of the stop 24 there may be provided a spring 27 which will bear against the upper end of the bolt 7.

The friction means 10 of the pawl may conveniently be formed by utilizing a simple leaf spring 28 having attached thereto a wear resisting member 29. To provide means for compensating for loss of spring tension, wear and the like, the bosses 30, 30 on the pawl 1 are adapted to have a pin and slot engagement therewith so that either or both may be moved to regulate the pressure between the spring 28 and the drum 9.

Figure 8:
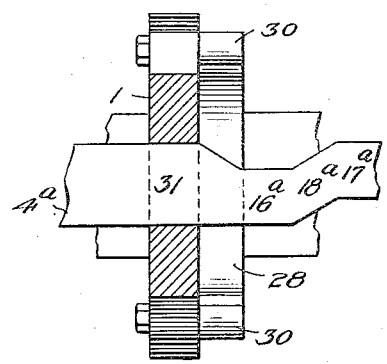
Figure 8 is a fragmentary view in plan showing a modified form of stop control member.

In Fig. 8 the control bar 4ª is provided with the offset stop and cam portions 16ª, 17ª and 18ª, similar in function to the stop and cam portions 16, 17 and 18. The bar 4ª is, however, further provided with a portion 31 of greater width than the portions 16 and 17. The purpose of this portion 31 is the same as that of the bolt 7 of the other figures, since the width of the portion 31 is the same as the width of the slot 5 in the pawl 1, it will be apparent that when the bar 4 is moved with reference to the pawl so as to bring the portion 31 into register with the slot 5, the pawl will be locked against rotation in either direction.

Figure 6:
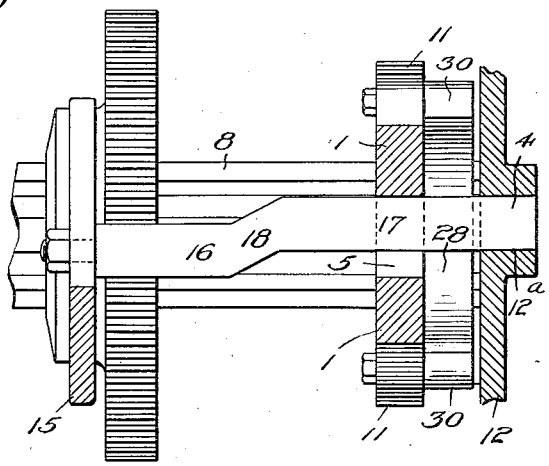
Figure 6 is a view similar to Fig. 4, showing, however, the position the stop control member assumes under a movement in one direction of a transmission control member.

The operation of the device shown in Figs. 1 to 7 is as folows: When the control bar 4 is in the position indicated in Figs. 3, 4 and 6, the gear shift fork is either in neutral position, as indicated in Fig. 4, or has been moved forwardly as indicated in Fig. 6, which in the particular type of gear mechanism, is the position of low speed or low gear operation. It will be observed that the shouldered portion of the control bar, that is, the stop portion 17, lies closely adjacent the edge of the opening or slot 5 in the pawl 1, and hence prevents the rotation of the pawl in a direction which would interfere with the continual power rotation of the sprocket or gear wheel 11. Should the transmission gearing attempt to rotate in the opposite direction, as for instance, the vehicle or mechanism being operated upon by gravity in a reverse direction from that in which it is driven, the pawl 1 is free to rotate in the opposite direction owing to the space between the opposite shoulder 17 and the adjacent edge of the slot 5, and this rotation is sufficient to bring the finger or tooth of the pawl into intermeshing relation with the sprocket or ratchet wheel 11. It will of course be obvious that the rotation of the pawl will be caused by the frictional contact between the friction member 10 thereof and the drum 9 on the shaft 8.

In changing gears from a low speed or low gear operation to higher gears operating in the same direction—say forward—the shift fork 15 is first brought to neutral position as shown in Fig. 4. With the control bar in neutral position the higher gears may be then engaged by means of a shift fork 15ª. With the stop portion 17 coacting with the pawl 1 during all engagements of the higher gears movement forwardly in the driven direction is permitted but not in reverse. It is to be noted that the pawl operates immediately on the change of direction before the parts have attained velocity, and that consequently the stop mechanism is not subjected to additional strains due to momentum.

Figure 7:
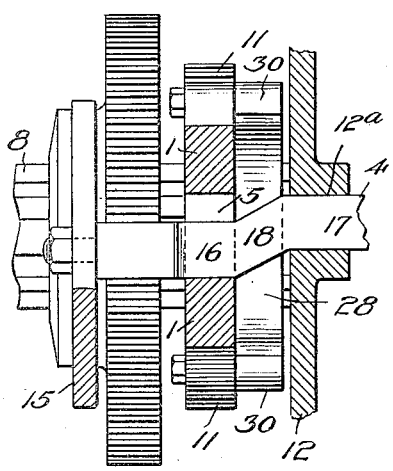
Figure 7 is a similar view illustrating the position of the parts upon a movement of the transmission control member from that shown in Fig. 6.

In Fig. 7 I have shown the gear shift fork in reverse position. The offset stop portion 16 of the control bar 4 then engages the opposite side wall of the slot 5 from that which was previously engaged by the portion 17. In the position that the parts occupy in Fig. 7 the transmission may be power driven in reverse without the possibility of the pawl engaging the sprocket or ratchet wheel 11, but the space on the opposite side of the bar from the engaging portion will of course permit the pawl to engage the ratchet or gear should the transmission or vehicle be moved forwardly or in a direction reverse to that to which it is being urged by the engine or other source of power.

The operation of the device shown in Fig. 8 is identical with that previously described except that a portion of the bar 4ª at a point spaced from the adjacent stop face 16ª is preferably made of a width equal to the width of the slot 5 in the pawl, so that should the bar be moved longitudinally so as to bring this enlarged portion into engagement with the slot of the pawl the latter is automatically held against pivotal movement in either direction. This construction of course is a substitute for the locking bolt and conical recess illustrated and described with reference to the other figures.

I claim:—

1. In a device of the character described, the combination with a rotating element, of a double ended pawl member pivotally mounted adjacent the said element, means on said element adapted to be engaged by either end of said pawl, and means for positively positioning said pawl to prevent revolution of said element in one direction.

2. In a device of the character described, the combination with a rotating element, of a double ended pawl member pivotally mounted adjacent the said element, means on said element adapted to be engaged by either end of said pawl, means carried by said pawl for rotating the same in an opposite direction to the rotation of said element, and means for positively positioning said pawl to prevent revolution of said element in one direction.

3. In a device of the character described, the combination with a rotating element, of a double ended pawl member pivotally mounted adjacent the said element, means on said element adapted to be engaged by either end of said pawl, and means frictionally interposed between said pawl and said element for causing said pawl to be rotated in a direction opposite to the rotation of said element.

4. In a device of the character described, the combination with a housing, of a rotating element therein, a pawl pivotally connected to said housing, a toothed member connected to said element for rotation therewith, means for causing the engagement of said pawl and said member when rotated in either direction, and means slidably engaging said pawl for controlling the direction of rotation thereof.

5. In a device of the character described, the combination with a housing, of a rotating element therein, a pawl pivotally connected to said housing, a toothed member connected to said element for rotation therewith, means for causing the engagement of said pawl and said member when rotated in either direction, means slidably engaging said pawl for controlling the direction of rotation of said pawl, and means for rendering said pawl inoperative at will.

6. In a device of the character described, the combination with a housing, of a driven element therein, a pawl pivotally connected to said housing, a toothed wheel secured to said element, friction means for causing the engagement of said pawl and said wheel when rotated in either direction, and a bar slidably engaging said pawl for controlling the direction of engagement thereof.

7. In a device of the character described, the combination with a housing, of a driven shaft therein, a rotatable pawl mounted in said housing, a ratchet wheel fastened to said shaft, means for causing the engagement of said pawl and said wheel, and means having a plurality of oppositely disposed stop surfaces slidably engaging said pawl for preventing the rotation thereof in a predetermined direction.

8. In a device of the character described, the combination with a housing, of a rotating element therein, a rotatable pawl, cooperating bearing surfaces on said pawl and housing, a toothed member secured to said element, means for causing the rotation of said pawl in a direction opposite the rotation of said member, and means for selectively preventing the rotation of said pawl in either direction.

9. In a device of the character described, the combination with a housing, of a rotatable pawl mounted therein, a toothed member rotating within said housing, friction means for causing the engagement of said pawl and said member, a bar slidably engaging said pawl for controlling the direction of engagement thereof, and means for rendering the pawl inoperative at will.

10. In a device of the character described, the combination of a gear transmission and a stop mechanism adapted to operate automatically to oppose in either direction of rotation, the operation of the transmission in a direction other than that for which the gears are set.

11. In a device of the character described, the combination with a transmission having gears and gear shifting means, of a stop mechanism adapted to restrain in either direction of rotation, the movement of the transmission gears in a direction other than the direction for which the gears are set, said mechanism being controlled by means actuated by said gear shifting means.

12. In a device of the character described, the combination with a transmission having gears and gear shifting means, of a stop mechanism for controlling said gears in either direction of rotation, control means for said stop mechanism, and means for rendering said mechanism inoperative at will, said control means being actuated by said gear shifting means.

13. In a device of the character described, the combination with a housing, a pawl movably mounted therein, a member rotatable within said housing and provided with projections thereon adapted to be engaged by said pawl when rotated in either direction, means for causing the engagement of said pawl and member, and a bar cooperating with said pawl for controlling the action thereof.

In testimony whereof I affix my signature.

EDWARD M. SHINKLE.